(12) United States Patent
Ohl et al.

(10) Patent No.: US 8,646,331 B2
(45) Date of Patent: Feb. 11, 2014

(54) INERTIAL SENSOR CLUSTER AND SENSOR SYSTEM

(75) Inventors: Christian Ohl, Pfullingen (DE); Dirk Ullmann, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 13/290,917

(22) Filed: Nov. 7, 2011

(65) Prior Publication Data

US 2012/0125097 A1 May 24, 2012

(30) Foreign Application Priority Data

Nov. 23, 2010 (DE) .......................... 10 2010 061 757

(51) Int. Cl.
*G01P 1/02* (2006.01)

(52) U.S. Cl.
USPC .................................. 73/493; 73/510; 73/431

(58) Field of Classification Search
USPC ............................................ 73/493, 510, 431
See application file for complete search history.

(56) References Cited

U.S. PATENT DOCUMENTS 7,293,479 B2 * 11/2007 Sillanpaa et al. ............... 73/431
8,148,187 B2 * 4/2012 Ratzel et al. .................... 73/493

FOREIGN PATENT DOCUMENTS

DE        10 2007 057 441        6/2009

* cited by examiner

*Primary Examiner* — John Chapman, Jr.
(74) *Attorney, Agent, or Firm* — Kenyon & Kenyon LLP

(57) ABSTRACT

A sensor device includes an outer casing, a first sensor module and a second sensor module. The outer casing encloses the first sensor module and the second sensor module at least partially. The first sensor module is enclosed at least partially by a first medium, and the second sensor module is enclosed at least partially by a second medium.

10 Claims, 2 Drawing Sheets

INERTIAL SENSOR CLUSTER AND SENSOR SYSTEM

BACKGROUND OF THE INVENTION

1. Field of the Invention

The present invention is directed to a sensor device having at least two sensor modules.

2. Description of the Related Art

Sensor devices have been used in vehicles for many years for detecting the vehicle kinematics and make it possible to regulate the operating dynamics of a vehicle (e.g., in ESP systems) or to control the safety functions of the vehicle, such as triggering the airbag. Such sensor devices must meet high demands with regard to their susceptibility to failure and reliability.

For example, published German patent application document DE 10 2007 057 441 A discloses a sensor device having a sensor module situated on a printed board, the sensor module being essentially entirely enclosed in a volume-elastic medium, the volume-elastic medium having a low-pass behavior. The low-pass behavior advantageously allows the coupling of higher-frequency interference signals in the sensor device to be suppressed with the aid of damping, and to thus ensure the proper operation of the sensor device.

While such a low-pass behavior is perfectly desirable for many sensor types which are used for chassis regulation, such as yaw-rate sensors, other sensor types, such as crash sensors, essentially require an undamped power transmission of the vehicle and the coupling of higher-frequency oscillations. In order to meet these various demands, different sensor types have each hitherto been placed in a separate casing, thus requiring a disadvantageously great installation space and incurring relatively high manufacturing costs. In the related art, no sensor device is known so far which allows the advantageous combination of different sensor types, which operate in different frequency ranges and require a different damping behavior of the surrounding medium, in only one casing and thus the implementation of sensor devices which are particularly compact with regard to installation space.

BRIEF SUMMARY OF THE INVENTION

The sensor device according to the present invention has the advantage over the related art that the sensor device has a first and a second sensor module, the first sensor module being enclosed by a first medium, and the second sensor module being enclosed by a second medium, so that it is advantageously possible to highly flexibly adapt the first and the second media to the requirements of the first and the second modules, respectively, and to thus achieve a particularly reliable and interference-resistant sensor device which includes different sensor types. For example, it is preferably possible to simultaneously accommodate a yaw-rate sensor for chassis regulation and a crash sensor for recognizing an accident situation in only one sensor device; a particularly reliable and interference-free operation of both sensor types may be ensured by appropriately selecting the first and the second media. Preferably, the first and the second media essentially entirely fill out the particular area between the outer shell and the first and the second sensor modules, so that a mechanically stable fixing of the first and the second sensor modules may be implemented simultaneously with the aid of the first and the second media, and other fixing elements, which are mostly complicated to manufacture, may be dispensed with. Furthermore, the first and the second media offer a protective function against mechanical shocks and vibrations. Additionally, the sensor device according to the present invention may be implemented in a particularly compact and cost-effective manner and may thus be advantageously used, in particular in automobile manufacture. For example, a plurality of such sensor devices may be placed in an automobile in this way at relatively low cost, in order to generate several redundant measuring signals and to thus minimize the susceptibility to failure of a sensor system in an automobile.

According to a preferred refinement, it is provided that the first medium includes a first volume-compressible material and/or that the second medium includes a second volume-compressible material. In particular, it is preferred according to the present invention that the first and/or the second medium has/have a frequency-filter behavior and preferably function(s) as a low-pass filter. This makes it advantageously possible to damp higher-frequency interference signals coupled into the sensor device and to thus also suppress or essentially completely avoid resonance exaggerations of the measuring signal, which significantly increases the accuracy of a yaw-rate measurement, for example, when a yaw-rate sensor is used. It is preferred according to the present invention that the first volume-compressible material has a lower compressibility than the second volume-compressible material. For this reason, it is conceivable, for example, that the first material is volume-elastic only lightly or essentially not at all, so that force effects on the outer casing of the sensor device are transmitted essentially undamped on the first sensor module as it is advantageous in the case of a crash sensor for detecting high-frequency acceleration signals. Preferably, the first and/or the second material is/are an elastomer which contains gas bubbles, the compressibility of the elastomer being advantageously adjustable within a manufacturing process via the volume fraction of the gas bubbles. Depending on the desired compressibility and the damping properties associated with it, the volume fraction of the gas bubbles preferably ranges between 0.5% and 30%. In this way, it is advantageously possible according to the present invention to optimize the compressibility of the first and the second media with regard to the damping properties required for the particular sensor type with the aid of a relatively simple and cost-effective manufacturing method, and to thus make available a particularly reliably performing sensor device.

According to one preferred refinement, it is provided that the first sensor module and the second sensor module are electrically conductively connected to only one single contact element for supplying power and transmitting signals, the contact element having only two electrically isolated electrical contact parts, in particular two connection pins. Preferably, the electrical contact parts are at least partially accessible from the outside of the outer casing. The electrical contact parts are particularly preferably implemented, at least in a subarea, as plug contacts for conventionally available plugs, so that a particularly simple electrical connection to the sensor device is possible. By using only two electrical contact parts, it is advantageously possible to use particularly small plugs for the connection to the sensor device, whereby the installation space requirement of the sensor device according to the present invention may particularly advantageously be reduced. Furthermore, it is preferred according to the present invention that the contact element is made of a continuous metal part manufactured with the aid of a punching technique and is thus manufacturable particularly cost-effectively. While sensor modules in the related art are mostly situated on a relatively bulky printed board, the sensor device according to the present invention has the advantage that the first and/or the second sensor module(s) is/are directly connected to the contact element, thus allowing for a particularly compact sensor device with regard to installation space, a high mechanical stability being furthermore ensured by enclosing the first and the second sensor modules in a first and a second media.

Furthermore, it is provided according to one preferred refinement that the first sensor module is essentially rigidly connected to the contact element, the second sensor module being essentially flexibly connected to the contact element. In this case, "rigid" means that movements, in particular oscillations, of the contact element are essentially entirely transmitted to the first sensor module; "flexible," in contrast to that, means that movements of the contact element are essentially transmitted only in a damped manner or not at all to the second sensor module. In this way, it is advantageously possible that the second sensor module is partially or almost entirely decoupled from the outer casing in terms of oscillations, so that interference signals for the second sensor module may be largely suppressed, while, on the other hand, the first sensor module is advantageously coupled to the outer casing in terms of oscillations, so that external oscillations, e.g., in the case of a crash situation, are transmitted to the first sensor module essentially undamped.

Furthermore, it is preferred according to the present invention that the first sensor module is electrically isolated from the second sensor module, the first sensor module and the second sensor module being preferably electrically connected via the contact element. In this way, it is advantageously possible to electrically decouple the first sensor module from the second sensor module and to thus make available particularly interference-free measuring signals.

According to one preferred refinement, it is further provided that the sensor device has a fixing element. Advantageously, it is thereby possible to flexibly position the sensor device within a vehicle and to ensure a mechanically stable fixing. It is preferred according to the present invention that a force effect on the fixing element is transmittable essentially undamped to the first sensor module and essentially damped to the second sensor module. This makes it advantageously possible to couple higher-frequency acceleration signals essentially loss-free into the first sensor module, while simultaneously advantageously suppressing higher-frequency interference signals in the second sensor module.

Furthermore, it is provided according to one preferred refinement that the sensor device includes a first evaluation unit and/or that the second sensor module includes a second evaluation unit. This makes it advantageously possible to process the measuring signals directly within the sensor device, so that the signal paths may be kept advantageously short, and a coupling of external electromagnetic interference radiation, e.g., due to long cable paths, may thus largely be avoided. Furthermore, the sensor device forms a self-contained measuring system by using an inherent evaluation unit and may thus be used particularly flexibly and comfortably at different installation sites of a vehicle.

Furthermore, it is provided according to one preferred refinement that the first and/or the second sensor module include(s) a micromechanical sensor element, in particular a micromechanical acceleration sensor and/or a micromechanical yaw-rate sensor and/or a micromechanical pressure sensor. In this way, the sensor device may be implemented in a particularly compact manner with regard to installation space and may be used flexibly in a vehicle for detecting the vehicle kinematics. According to the present invention, the first sensor module preferably includes a micromechanical crash sensor, and the second sensor module includes a micromechanical acceleration sensor and/or a micromechanical yaw-rate sensor. This makes it advantageously possible, with the aid of only one sensor device, to detect high-frequency acceleration signals, e.g., caused by a crash situation, as well as to measure with great accuracy low-frequency signals caused by a vehicle rotation and/or moderate vehicle acceleration. The sensor device may thus be used in many different ways.

Furthermore, the present invention relates to a sensor system for a vehicle, in particular for a motor vehicle, having a first sensor device according to the present invention and a control unit, the first sensor device being electrically conductively connected to the control unit, the first sensor device being situated in a first position in the vehicle. Therefore, it is advantageously possible according to the present invention to detect the vehicle kinematics of the vehicle and/or a crash situation with the aid of the sensor device according to the present invention and the control unit, and to use the obtained measured values for regulating the vehicle dynamics or for triggering safety functions, e.g., for triggering an airbag. By using the sensor device according to the present invention, it is furthermore advantageously and particularly cost-effectively possible to already detect several different measured variables with the aid of only one sensor device which is compact with regard to installation space. It is preferred according to the present invention that the first sensor device is designed for measuring a yaw rate acting in a first direction and/or for measuring an acceleration acting along a direction perpendicular to the first direction. This, for example, makes it advantageously possible to simultaneously detect a yaw rate and/or a transverse acceleration and/or a frontal acceleration with the aid of the first sensor device.

It is provided according to one preferred refinement that the sensor system includes a second sensor device, the second sensor device being electrically conductively connected to the control unit, the second sensor device being situated in a second position in the vehicle which is spatially separated from the first position. In this way, it is advantageously possible to detect measured variables for the vehicle kinematics and/or a crash situation at different positions of a vehicle and to evaluate them together with the aid of the control unit. Preferably, the first and the second sensor devices are positioned symmetrically to one another within the vehicle, for example on opposite sides of the vehicle or in the front and rear areas. Furthermore, the particularly compact design of the sensor device according to the present invention allows for a flexible positioning within a vehicle. It is further preferred according to the present invention that the second sensor device is designed for measuring the yaw rate acting in the first direction and/or for measuring an acceleration acting along a direction perpendicular to the first direction. In this way, it is advantageously possible to redundantly detect measured variables for the vehicle kinematics and/or the crash situation and to check their plausibility with the aid of the control unit. In this way, error states of a sensor device which lead to falsified measuring signals, for example, may be advantageously detected and corrected, so that a particularly high degree of reliability of the sensor system is ensured. Furthermore, it is advantageously possible according to the present invention that the demands on the control unit and the sensor modules may be kept relatively low due to the redundant detection of measured variables, and thus a relatively cost-effective control unit and relatively cost-effective sensor modules may be used.

Moreover, the present invention relates to a method for operating a sensor system according to the present invention, characterized in that at least one first measuring signal is generated with the aid of the first sensor device, the at least one measuring signal being transmitted to the control unit for evaluation. In this way, it is advantageously possible to detect a plurality of measuring signals for vehicle kinematics and/or for a crash situation and to evaluate them with the aid of the control unit, so that a particularly reliable regulation of the vehicle dynamics or the control of safety functions of the vehicle is ensured.

DETAILED DESCRIPTION OF THE INVENTION

Figure 1:
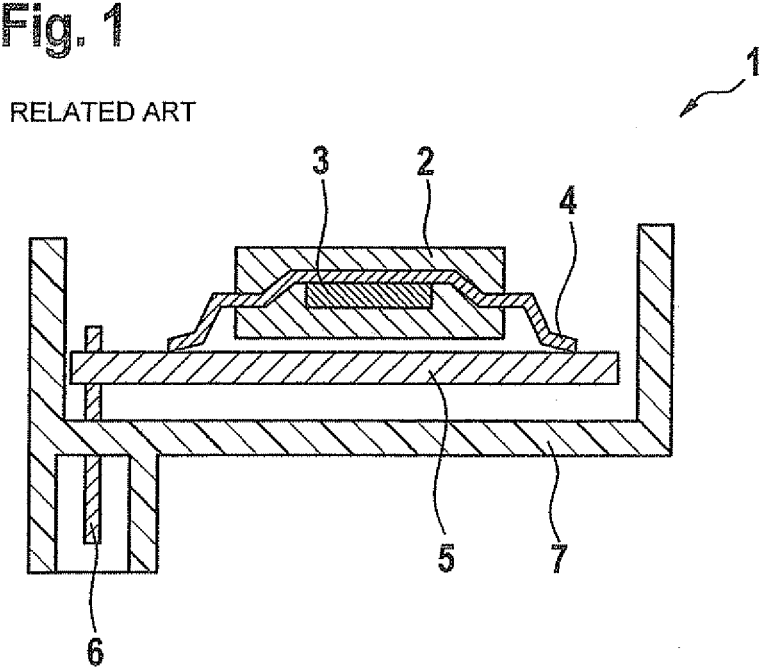
FIG. 1 schematically shows a cross section of a sensor device according to the related art.

FIG. 1 schematically shows a cross section of a sensor device 1 according to the related art, sensor device 1 including a sensor module 2 having a sensor element 3, sensor module 2 being situated on a printed board 5, sensor module 2 being electrically conductively connected to printed board 5 via a connecting element 4, e.g., a carrier strip, printed board 5 being electrically conductively connected to a contact element 6 and being fixed on an outer casing 7. Outer casing 7 includes sensor module 2 at least partially or preferably entirely, so that adequate protection of sensor module 2 is ensured. Contact element 6 usually includes multiple connection pins for supplying sensor module 2 with power and for reading out the measuring signals. Furthermore, contact element 6 is accessible at least partially from the outside and allows a conventional plug to be connected, for example.

Figure 2:
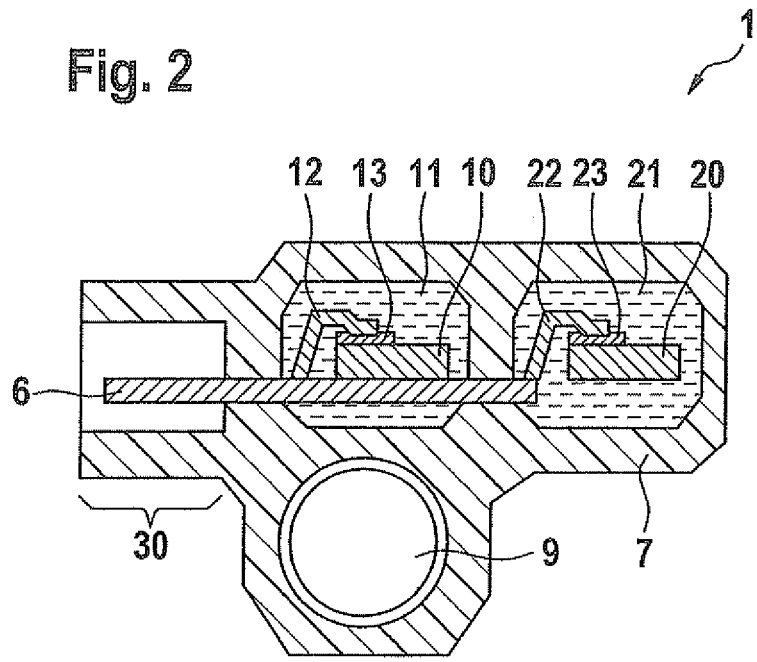
FIG. 2 schematically shows a cross section of a sensor device according to the present invention according to one example embodiment.

FIG. 2 schematically shows a cross section of a preferred specific embodiment of sensor device 1 according to the present invention, sensor device 1 having a first sensor module 10 and a second sensor module 20. First and second sensor module 10, 20 are located in an outer casing 7, first sensor module 1 being essentially entirely enclosed by a first medium 11 and second sensor module 20 being essentially entirely enclosed by a second medium 21, and first medium 11 essentially, entirely filling out the area between first sensor module 10 and outer casing 7, and second medium 21 essentially entirely filling out the area between second sensor module 20 and outer casing 7. This makes it advantageously possible according to the present invention that first and second sensor modules 10, 20 are already held mechanically stable without additional fixing means within outer casing 7. Outer casing 7 is made of a plastic, for example, and may be implemented in a cost-effective casting process or an extrusion process around first and second media 11, 21.

According to the present invention, it is advantageously provided that first medium 11 has a first volume-compressible material and second medium 21 has a second volume-compressible material, whereby oscillations and shocks of outer casing 7 are damped as a function of the compressibility of the first and the second materials, so that coupling of high-frequency interference signals is suppressible, for example. First and second sensor modules 10, 20 further have contact zones 13, 23 for electrical contacting, contact zones 13, 23 being electrically conductively connected to a contact element 6 via connecting elements 12, 22. Contact element 6 has, for example, a plurality of connection pins which are preferably implemented in a subarea 30 of contact element 6 as plug contacts for a conventional plug. Preferably, contact element 6 has only two connection pins, so that the installation space requirement of sensor device 1 may largely be reduced.

Furthermore, according to the illustrated specific embodiment, first sensor module 10 rests essentially entirely on contact element 6 and is thus fixed mechanically rigidly to contact element 6. Such a fixing is implementable with the aid of a small adhesive plate, for example. In this case, it is possible according to the present invention to transmit oscillations of the outer casing directly to first sensor module 10, so that high-frequency oscillations resulting from a crash situation of a vehicle may be advantageously coupled into first sensor module 10, for example, thus allowing for a reliable detection of the crash situation. Preferably, first sensor module 10 includes, for example, a micromechanical crash sensor. Furthermore, second sensor module 20 is flexibly connected to contact element 6 only via a second connecting element 22 according to the illustrated specific embodiment, and is thus essentially mechanically decoupled from outer casing 7, in particular, if second medium 21 has great damping properties. Thus, interference signals transmitted via outer casing 7 may be advantageously suppressed for second sensor module 20. Preferably, second sensor module 20 includes a micromechanical yaw-rate sensor and/or a micromechanical acceleration sensor, for example; a particularly reliable and noise-free operation of second sensor module 20 may be ensured by damping high-frequency interference signals. Furthermore, outer casing 7 has a fixing element 9 and may thus be easily placed within a vehicle. The illustrated specific embodiment of sensor device 1 according to the present invention is implementable in an extremely compact manner compared to sensor devices of the related art and advantageously has a size of less than 20 cm$^3$, thus allowing for a particularly flexible use within a vehicle.

Figure 3:
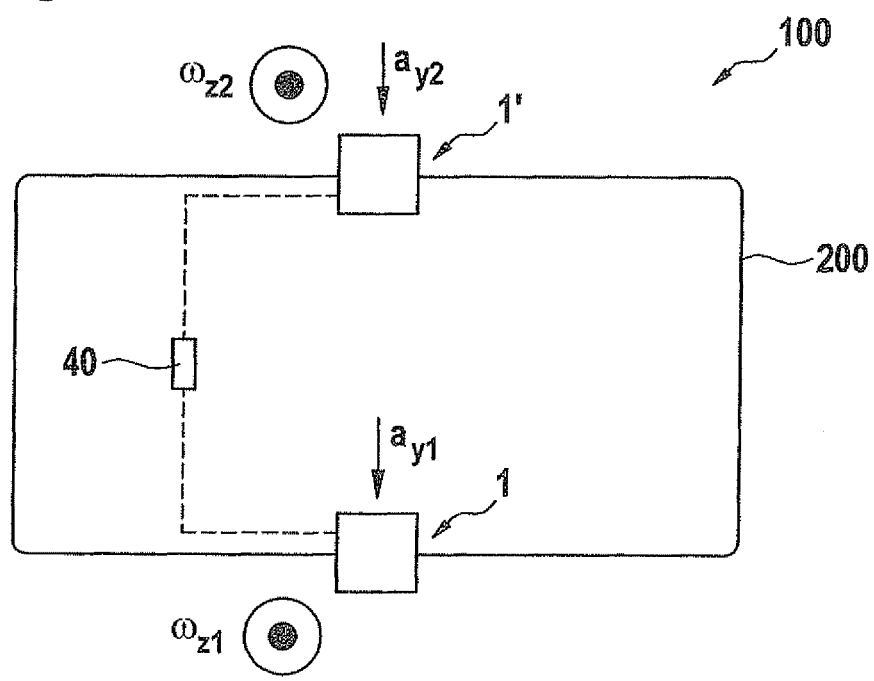
FIG. 3 schematically shows a sensor device according to the present invention according to an example embodiment.

FIG. 3 schematically shows a preferred specific embodiment of a sensor system 100 according to the present invention in a vehicle 200, sensor system 100 including a first sensor device 1 according to the present invention and a second sensor device 1' according to the present invention, first sensor device 1 being situated on a first side of vehicle 200 and second sensor device 1' being situated on the side of vehicle 200 opposite that of first sensor device 1. Furthermore, first and second sensor devices 1, 1' are electrically conductively connected to a control unit 40. Control unit 40 includes, for example, a microprocessor for evaluating measuring signals of first and second sensor devices 1, 1' and for regulating the vehicle dynamics (e.g., in the form of an ESP system) and/or for triggering safety functions (e.g., triggering of airbags). First and second sensor devices 1, 1' preferably include a crash sensor for measuring high-frequency acceleration signals, an acceleration sensor for measuring low-frequency acceleration signals, and a yaw-rate sensor for measuring a yaw rate of vehicle 200. In particular, it is preferred that the acceleration sensor and the yaw-rate sensor are situated in only one sensor module 10, 20 of sensor device 1, 1' according to the present invention, so that, with regard to installation space, a particularly compact sensor device 1, 1' is implementable.

According to the illustrated exemplary embodiment, first and second sensor devices 1, 1' for detecting a first and a second transverse accelerations $a_{y1}$, $a_{y2}$ and for detecting a first and a second yaw rates $\omega_{z1}$, $\omega_{z2}$ are implemented on the first and the second side of vehicle 200. A yaw rate acting on vehicle 200 may thus be detected redundantly, for example, with the aid of the spatially separated measurement of first and second yaw rates $\omega_{z1}$, $\omega_{z2}$ and with the aid of the spatially separated measurement of centrifugal accelerations $a_{y1}$, $a_{y2}$ caused by the yaw rate. Furthermore, centrifugal accelerations $a_{y1}$, $a_{y2}$ may also be additionally measured with the aid of the crash sensors which are installed in sensor devices 1, 1'. The plurality of the partially redundant measuring signals may subsequently be evaluated and checked for plausibility by control unit 40. This advantageously allows, for example, transverse accelerations to also be detected, e.g., in the case of the lateral sliding or break-away of vehicle 200, which act in addition to the centrifugal accelerations. Similarly, in the case of a crash situation, a plurality of measuring signals may be used for a plausibility check, so that a faster triggering of airbags is also made possible, for example. Sensor system 100 according to the present invention thus allows a particularly reliable regulation of the vehicle dynamics and control of safety functions at a relatively low cost.

What is claimed is:

1. A sensor device, comprising:
   an outer casing;
   a first sensor module; and
   a second sensor module;
   wherein the outer casing at least partially encloses the first sensor module and the second sensor module, and wherein the first sensor module is at least partially enclosed by a first medium, and wherein the second sensor module is at least partially enclosed by a second medium.

2. The sensor device as recited in claim 1, wherein at least one of (i) the first medium includes a first volume-compressible material, and (ii) the second medium includes a second volume-compressible material, the first volume-compressible material having a lower compressibility than the second volume-compressible material.

3. The sensor device as recited in claim 1, wherein the first sensor module and the second sensor module are electrically conductively connected to one single contact element for supplying power and transmitting signals, the contact element having only two electrically isolated electrical contact parts, and wherein the first sensor module is connected rigidly to the contact element, and the second sensor module is connected flexibly to the contact element.

4. The sensor device as recited in claim 3, wherein the first sensor module is electrically isolated from the second sensor module except for the electrical connection provided by the contact element linking the first sensor module and the second sensor module.

5. The sensor device as recited in claim 1, further comprising:
   a fixing element, wherein a force effect on the fixing element is transmitted (i) in an essentially undamped manner to the first sensor module and (ii) in an essentially damped manner to the second sensor module.

6. The sensor device as recited in claim 1, wherein at least one of (i) the first sensor module includes a first evaluation unit, and (ii) the second sensor module includes a second evaluation unit.

7. The sensor device as recited in claim 6, wherein the first sensor module a micromechanical crash sensor, and wherein the second sensor module includes at least one of a micromechanical acceleration sensor and a micromechanical yaw-rate sensor.

8. A sensor system for a motor vehicle, comprising:
   a first sensor device having an outer casing, a first sensor module, and a second sensor module, wherein the outer casing at least partially encloses the first sensor module and the second sensor module, and wherein the first sensor module is at least partially enclosed by a first medium, and wherein the second sensor module is at least partially enclosed by a second medium; and
   a control unit;
   wherein the first sensor device is electrically conductively connected to the control unit, the first sensor device being situated at a first position in the vehicle, wherein the first sensor device is configured to measure at least one of a yaw rate acting in a first direction and an acceleration acting along a direction perpendicular to the first direction.

9. The sensor system as recited in claim 8, further comprising:
   a second sensor device electrically conductively connected to the control unit, wherein the second sensor device is situated at a second position in the vehicle, the second position being spatially separated from the first position, and wherein the second sensor device is configured to measure at least one of the yaw rate acting in the first direction and the acceleration acting along a direction perpendicular to the first direction.

10. A method for operating a sensor system, comprising:
    providing a first sensor device having an outer casing, a first sensor module, and a second sensor module, wherein the outer casing at least partially encloses the first sensor module and the second sensor module, and wherein the first sensor module is at least partially enclosed by a first medium, and wherein the second sensor module is at least partially enclosed by a second medium;
    providing a control unit, wherein the first sensor device is electrically conductively connected to the control unit, the first sensor device being situated at a first position in the vehicle, wherein the first sensor device is configured to measure at least one of a yaw rate acting in a first direction and an acceleration acting along a direction perpendicular to the first direction;
    generating at least a first measuring signal with the aid of the first sensor device; and
    transmitting the at least first measuring signal to the control unit for evaluation.

* * * * *